: US 9,227,500 B2
(45) Date of Patent: Jan. 5, 2016

(54) VEHICLE DOOR (71) Applicant: HONDA MOTOR CO., LTD., Tokyo (JP)

(72) Inventor: Yuuichirou Saiki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/424,317

(22) PCT Filed: Jun. 7, 2013

(86) PCT No.: PCT/JP2013/065804
§ 371 (c)(1),
(2) Date: Feb. 26, 2015

(87) PCT Pub. No.: WO2014/034218
PCT Pub. Date: Mar. 6, 2014

(65) Prior Publication Data
US 2015/0210149 A1    Jul. 30, 2015

(30) Foreign Application Priority Data

Aug. 31, 2012 (JP) ................. 2012-191014

(51) Int. Cl.
*B60J 10/08* (2006.01)
*B60J 5/04* (2006.01)
*B60R 1/06* (2006.01)
*B60J 10/00* (2006.01)

(52) U.S. Cl.
CPC ............ *B60J 10/085* (2013.01); *B60J 5/0404* (2013.01); *B60J 10/0062* (2013.01); *B60R 1/06* (2013.01)

(58) Field of Classification Search
CPC .......... B60J 5/04; B60J 5/0401; B60J 5/0402; B60J 5/0405; B60J 5/0406; B60J 5/0408; B60J 10/08; B60J 10/085; B60J 10/086; B60J 10/088; B60R 1/06
USPC ................ 296/146.1, 152, 146.5, 146.9, 1.11
See application file for complete search history.

(56) References Cited

U.S. PATENT DOCUMENTS 4,432,167 A * 2/1984 Watanuki ............... B60J 5/0404
                                                        49/502
4,956,943 A * 9/1990 Yamada ..................... B60J 5/04
                                                        296/146.2

(Continued)

FOREIGN PATENT DOCUMENTS

JP           3608509           10/2004

*Primary Examiner* — Gregory Blakenship
(74) *Attorney, Agent, or Firm* — Rankin, Hill & Clark LLP (57) ABSTRACT

A weather strip (50) has: a body section (51) which extends along a door sash (12) and an edge of a door body (11); a ridge section (52) which extends from the body section (51) so as to rise toward the outside of the vehicle; and an extension section (53) which extends at the root of the ridge section (52) from the body section (51) so as to be capable of being located between a door mirror (14) and the surface (23) of an upper piece section (21), the surface (23) facing the outside of the vehicle. The extension section (53) is gripped between a gap absorbing member (33) and the surface (23) of the door sash (12), the surface (23) facing the outside of the outside of the vehicle. Also, a protrusion section (54) is engaged with an engagement recess (55). The weather strip (50) is held down not at a fitting section (56) but also at the extension section (53) and the protrusion section (54). As a result, the weather strip (50) is less likely to come out of the door sash (12).

6 Claims, 9 Drawing Sheets

(56) References Cited

U.S. PATENT DOCUMENTS

| | | | | |
|---|---|---|---|---|
| 4,969,295 A * | 11/1990 | Nishikawa | B60J 5/0402 | 296/146.2 |
| 6,328,373 B1 * | 12/2001 | Pacella | B60J 5/0402 | 296/146.5 |
| 6,932,415 B1 * | 8/2005 | Van Houzen | B60J 10/0031 | 296/146.2 |
| 7,093,393 B2 * | 8/2006 | Hock | B60J 5/0402 | 296/146.9 |
| 2002/0083648 A1 * | 7/2002 | Shigesada | B60R 1/06 | 49/475.1 |
| 2006/0117706 A1 * | 6/2006 | Hooker | B60J 5/0404 | 52/785.1 |
| 2011/0194201 A1 * | 8/2011 | Muramatsu | B60R 1/06 | 359/871 |
| 2013/0328339 A1 * | 12/2013 | Hamada | B60R 1/06 | 296/1.11 |
| 2015/0239327 A1 * | 8/2015 | Brancaleone | B60J 5/0468 | 296/146.6 |

* cited by examiner

VEHICLE DOOR

TECHNICAL FIELD

The present invention relates to an improvement of a vehicular door for opening and closing a door opening portion formed in a vehicle body.

BACKGROUND ART

A vehicular door includes a weather strip abutting on the surrounding region of an edge of a door opening portion of a vehicle body for preventing intrusion of water from the door opening portion into the inside of a vehicle. A technique for providing a front vehicular door with a weather strip is known from, for example, patent literature 1 below.

The technique known from patent literature 1 is providing a door mirror to a corner between a front top part of a door body and a front bottom part of a door sash. A mirror base of the door body is mounted to cover the door sash and a weather strip is provided on a vehicular inside of the door sash for preventing intrusion of water from a door opening portion into the inside of a vehicle.

The weather strip is retained on the door sash by fitting in a weather strip mounting portion of a U-shaped cross-section formed on the door sash. However, it is difficult for only the weather strip mounting portion to retain the weather strip near the corner between the front top part of the door body and the front bottom part of the door sash. As one measure against this, generally, a method for retaining the weather strip by clips is considered. In this case, however, it is difficult to provide clip insertion holes near the corner at which the front bottom part of the door sash is connected to the front top part of the door body. In addition, the provision of the clips makes the structure complex, requiring an additional cost. An improvement is needed to retain the weather strip in the corner as well as to prevent the weather strip from being lifted up.

PRIOR ART LITERATURE

Patent Literature

Patent Literature 1: JP-B-3608509

SUMMARY OF INVENTION

Technical Problem

An object of the present invention is to provide a technique for providing a vehicular door with a simple structure retaining a weather strip on the vehicular door at a reduced cost.

Solution to Problem

According to one aspect of the present invention, as defined in claim 1, a vehicular door including a door body, a door sash provided on a top portion of the door body, a weather strip provided on vehicular insides of the door sash and the door body for abutment on a surrounding region of an edge of a door opening portion of a vehicle body, and a door mirror provided in a corner between a front top part of the door body and a front bottom part of the door sash, wherein the door mirror covers a front lower end portion of the door sash when the door mirror is viewed from a lateral side of a vehicle, wherein the weather strip has an extension section extending such that the extension section is interposed between the door mirror and an outside surface of the front lower end portion of the door sash, the outside surface of the front lower end portion of the door sash facing an outside of the vehicle, and wherein the extension section is sandwiched between the door mirror and the outside surface of the door sash.

Preferably, as defined in claim 2, a door sash moulding is mounted to the outside surface of the door sash, and the door sash moulding includes a lower end portion having an outer surface covered by the door mirror. In addition, the door sash moulding has a lower end distant from the top portion of the door body in an upward direction of the door, and the extension section is located between the lower end of the door sash moulding and the top portion of the door body.

Preferably, as defined in claim 3, the extension section abuts on the lower end of the door sash moulding.

Preferably, as defined in claim 4, the extension section includes a protrusion section between the door sash moulding and the door body, and the protrusion section projecting outwardly in a widthwise direction of the vehicle. In addition, the door mirror includes an engagement recess engaging the protrusion section, and a protrusion height from the extension section to a distal end of the protrusion section is smaller than a thickness of the door sash moulding in the widthwise direction of the vehicle.

Preferably, as defined in claim 5, the door mirror includes a mirror body, a mirror base mounting the mirror body to the corner, and a gap absorbing member having elasticity, the gap absorbing member being provided on a back surface of the mirror base, and the gap absorbing member is pressed by the mirror base against the door sash moulding and the weather strip.

Advantageous Effects of Invention

Regarding the invention defined in claim 1, when viewed from the lateral side of the vehicle, the door mirror covers the front lower end portion of the door sash. The weather strip has the extension section extending such that the extension section is interposed between the door mirror and the outside surface of the front lower end portion of the door sash. The door mirror is used to sandwich the extension section of the weather strip between the door mirror and the outside surface of the door sash. That is, the weather strip can be retained by the simple structure in the vehicular door without being lifting up. Since the door mirror and the outside surface of the door sash sandwich the weather strip therebetween, the use of clips can be abolished to thereby reduce the cost.

Regarding the invention defined in claim 2, since the door sash moulding is mounted to the outside surface of the door sash and the outer surface of the lower end portion of the door sash moulding is covered by the door mirror, a part of the door sash moulding covered by the door mirror can be short. The cost of the door sash moulding can be thus reduced. Since the lower end of the door sash moulding is distant from the top portion of the door body in the upward direction of the door and the extension section of the weather strip is located between the lower end of the door sash moulding and the top portion of the door body, the door sash moulding and the extension section can be arranged not to overlap in a thickness direction of the door. For this reason, the vehicular door can have a reduced thickness.

Regarding the invention defined in claim 3, the extension section of the weather strip abuts on the lower end of the door sash moulding such that the extension section limits a position of the door sash moulding in a longitudinal direction of the door sash moulding. As a result, there is no need for additional parts for limiting the position of the door sash moulding in the longitudinal direction of the door sash moulding. This leads to reducing the parts cost.

Regarding the invention defined in claim 4, the extension section of the weather strip includes the protrusion section projecting outwardly in the widthwise direction of the vehicle, and the door mirror includes the engagement recess for engagement with the protrusion section. Such a simple arrangement can prevent the weather strip from being pulled out. The protrusion height from the extension section to the distal end of the protrusion section is smaller than the thickness of the door sash moulding in the widthwise direction of the vehicle. For this reason, the protrusion section can engage the engagement recess with the door mirror abutting on the door sash, such that the vehicular door has a further small thickness.

Regarding the invention defined in claim 5, the door mirror includes the mirror body, the mirror base mounting the mirror body to the corner, and the gap absorbing member provided on the back surface of the mirror base. The gap absorbing member having elasticity fills a gap between the mirror base and each of the door sash moulding and the weather strip to thereby provide soundproof effect and waterproof effect. In addition, the gap absorbing member 33 having the elasticity absorbs a difference in dimension between the door sash moulding and the weather strip in the thickness direction of the door. For this reason, the mirror base to be disposed on a vehicular outside of the gap absorbing member can be a planar simple shape. Thus, in a case where the mirror case is made by resin-molding, the moldability is improved.

DESCRIPTION OF EMBODIMENT

A certain preferred embodiment of the present invention is described below with reference to the accompanying drawings.

Embodiment

Figure 1:
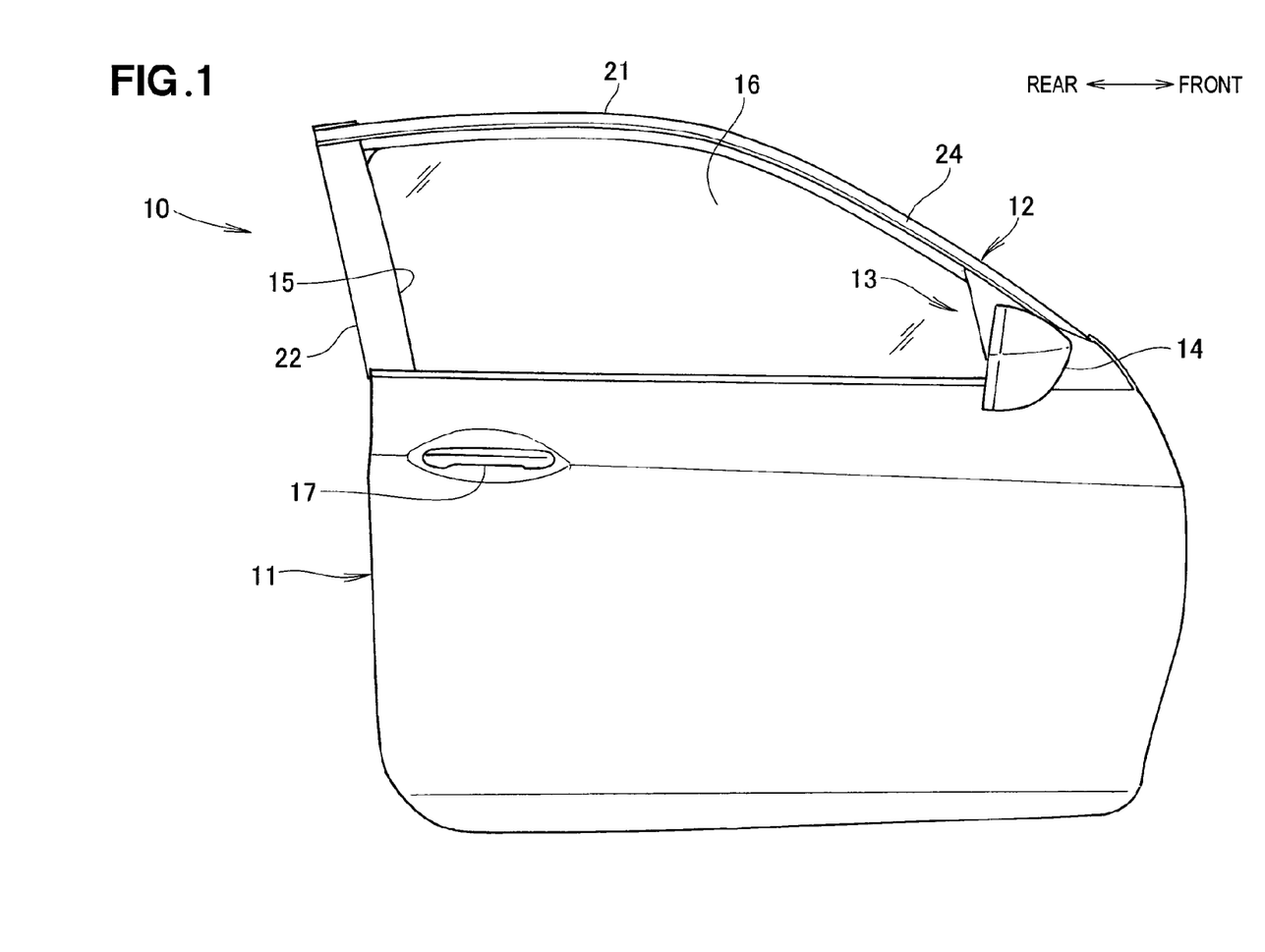
FIG. 1 is a side elevation view of a vehicular door according to the present invention.

As shown in FIG. 1, a vehicular door 10 is, for example, a hinged door provided on a side of a driver's seat of a vehicle. The vehicular door 10 includes a door body 11 and a door sash 12 provided on a top portion of the door body 11.

A door mirror 14 is provided in a corner 13 between a front top part of the door body 11 and a front bottom part of the door sash 12. The door sash 12 and an upper edge of the door body 11 surround a window opening portion 15. A door glass 16 is provided in the window opening portion 15 for opening and closing the window opening portion 15. An outer handle 17 is mounted on a rear upper part of the door body 11. The door sash 12 includes an upper piece section 21 and a lateral piece section 22.

Figure 2:
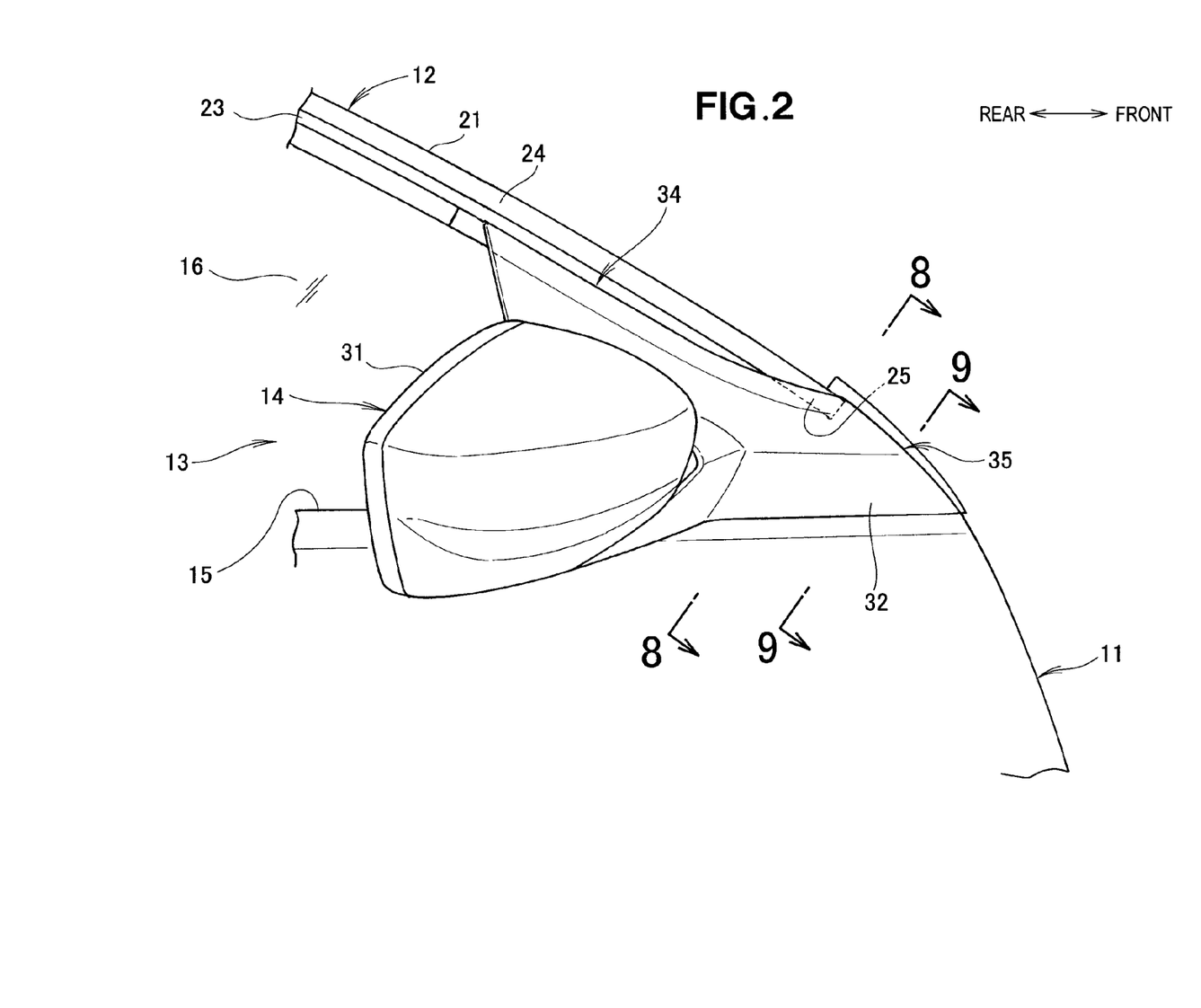
FIG. 2 is an enlarged view of the relevant part of the vehicular door shown in FIG. 1.
Figure 3:
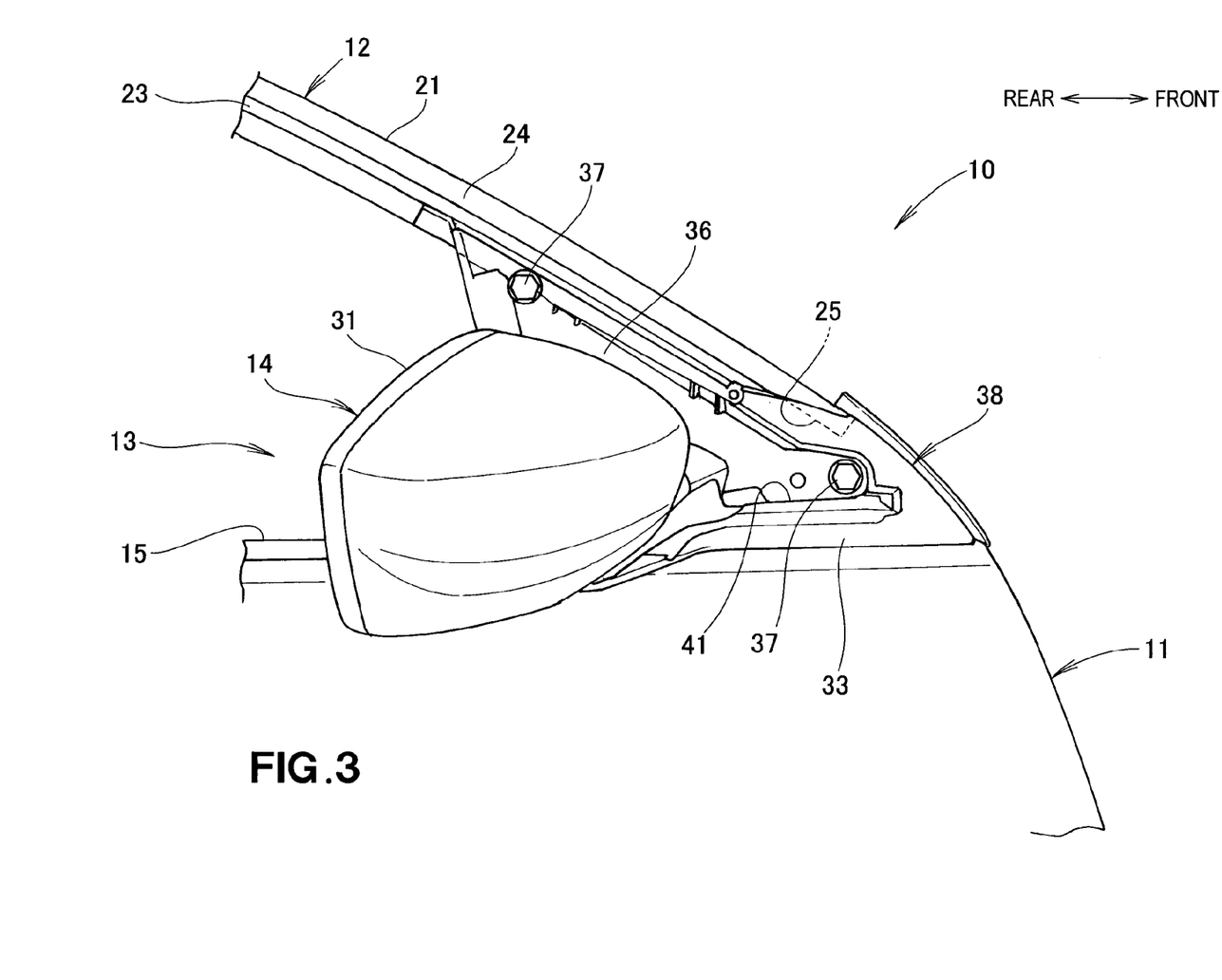
FIG. 3 is a view of the vehicular door shown in FIG. 2 with a mirror base removed.

As shown in FIGS. 2 and 3, the upper piece section 21 of the door sash 12 has a surface 23 facing the outside of the vehicle, and a door sash moulding 24 is mounted to the outside surface 23. The door mirror 14 has a mirror body 31, a mirror base 32 mounting the mirror body 31 to the corner 13 between the door body 11 and the door sash 12, and a gap absorbing member 33 provided on a back surface of the mirror base 32.

The mirror base 32 has a generally triangular shape as viewed from a lateral side of the vehicle. When viewed from the lateral side of the vehicle, an upper part of the mirror base 32 has an upper edge portion 34 extending along the upper piece section 21 and located below the door sash moulding 24, and a cover portion 35 covering a front lower end portion of the upper piece section 21 and covering an outer surface 25 of a lower end portion of the door sash moulding 24.

The cover portion 35 is convex in a forward direction of the vehicle to provide a specific outer visual appearance of the mirror base 32, thereby improving the design of the corner 13. The outside surface 23 of the door sash 12 is covered by the door sash moulding 24 and the mirror base 32, thereby improving the design of the entire door sash 12.

Next, a discussion is made as to the door 10 with the mirror base 32 removed. As shown in FIG. 3, the mirror body 31 has a stay 36 on a side of the gap absorbing member 33. The stay 36 is secured to the door sash 12 by bolts 37, 37. The gap absorbing member 33 has a cutout 41 formed therein to avoid overlapping the stay 36, when viewed from the lateral side of the vehicle.

The outer surface 25 of the lower end portion of the door sash moulding 24 is located closer to a vehicular inside than the gap absorbing member 33 is. When viewed from the lateral side of the vehicle, the outer surface 25 overlaps the gas absorbing member 33. The gap absorbing member 33 has a front side forming a bulge portion 38 which is convex in a location corresponding to a back surface of the cover portion 35 (FIG. 2) of the mirror base 32 (FIG. 2).

Figure 4:
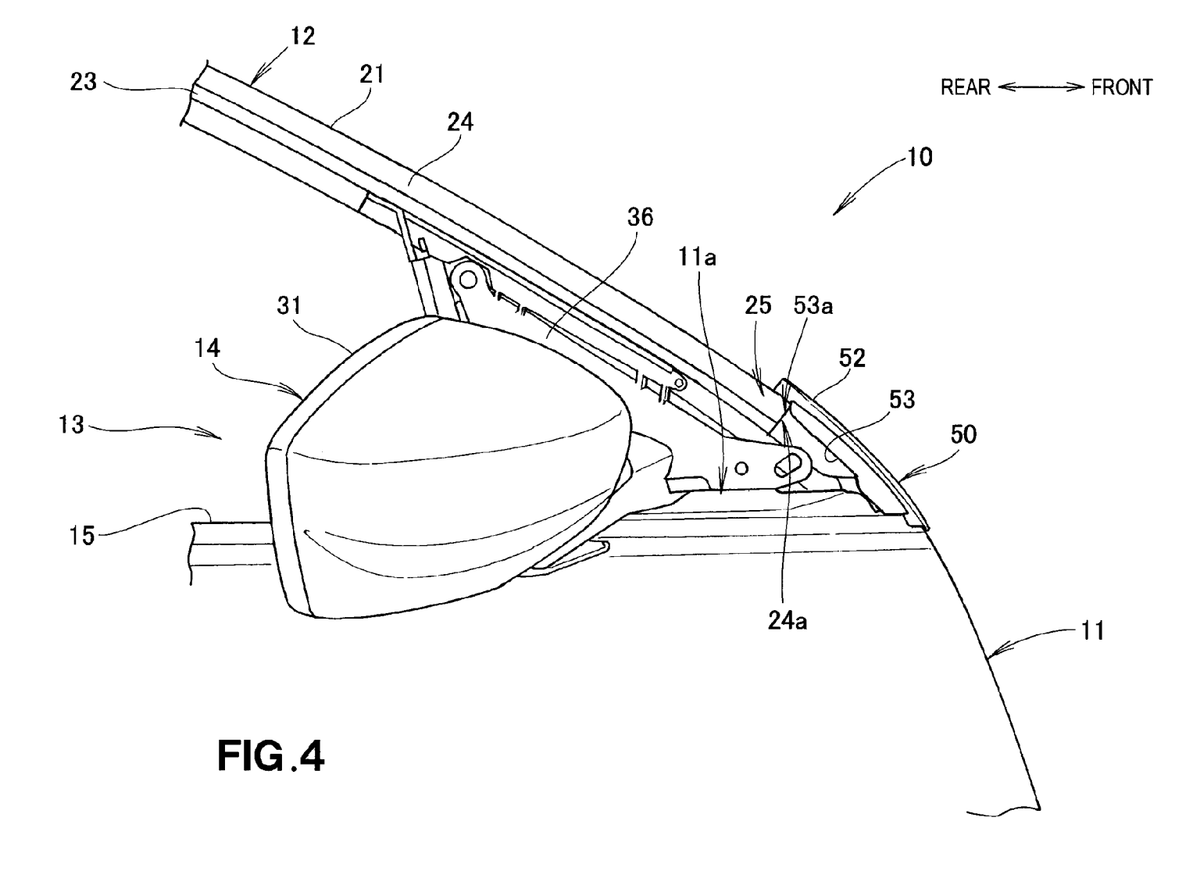
FIG. 4 is a view of the vehicular door shown in FIG. 3 with a gap absorbing member removed.
Figure 5:
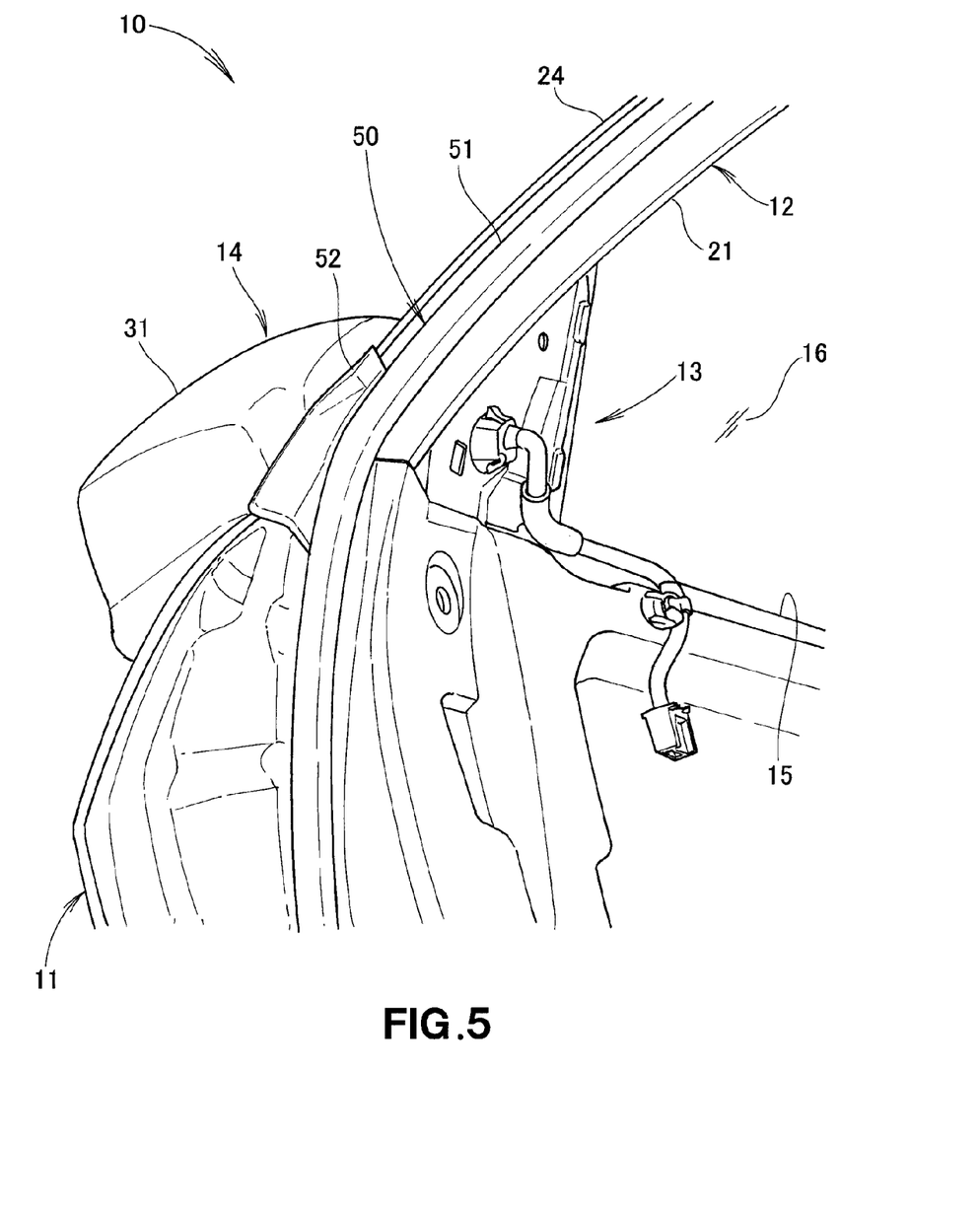
FIG. 5 is a perspective view of the relevant part of the vehicular door shown in FIG. 1.

Next, a discussion is made as to positioning of the weather strip. As shown in FIGS. 4 and 5, a weather strip 50 is provided on vehicular insides of the door sash 12 and the door body 11 and abuts on the surrounding region of an edge of a door opening portion of a vehicle body. The weather strip 50 has a body section 51 extending along edges of the door sash 12 and the door body 11, a ridge section 52 rising from the body section 51 in an outward direction of the vehicle, and an extension section 53 extending from the body section 51 at the root of the ridge section 52 such that the extension section 53 is interposed between the outside surface 23 of the upper piece section 51 and the door mirror 13.

The door sash moulding 24 does not extend to a lower end of the upper piece section 21 of the door sash 12, and the door sash moulding 24 has a lower end 24a distant from the top portion 11a of the door body 11 in an upward direction of the door. The extension section 53 is located between the lower end 24a of the door sash moulding 24 and the top portion 11a of the door body 11. The extension section 53 extends from the lower end 24a of the door sash moulding 24 to the top portion 11a of the door body 11. The lower end 24a of the door sash moulding 24 is positioned by abutting on an upper end 53a of the extension section 53.

The body section 51 of the weather strip 50 is provided on the vehicular insides of the door body 51 and the door sash 12.

The extension section 53 is disposed alongside the outside surface 23 of the door sash 12.

Figure 6:
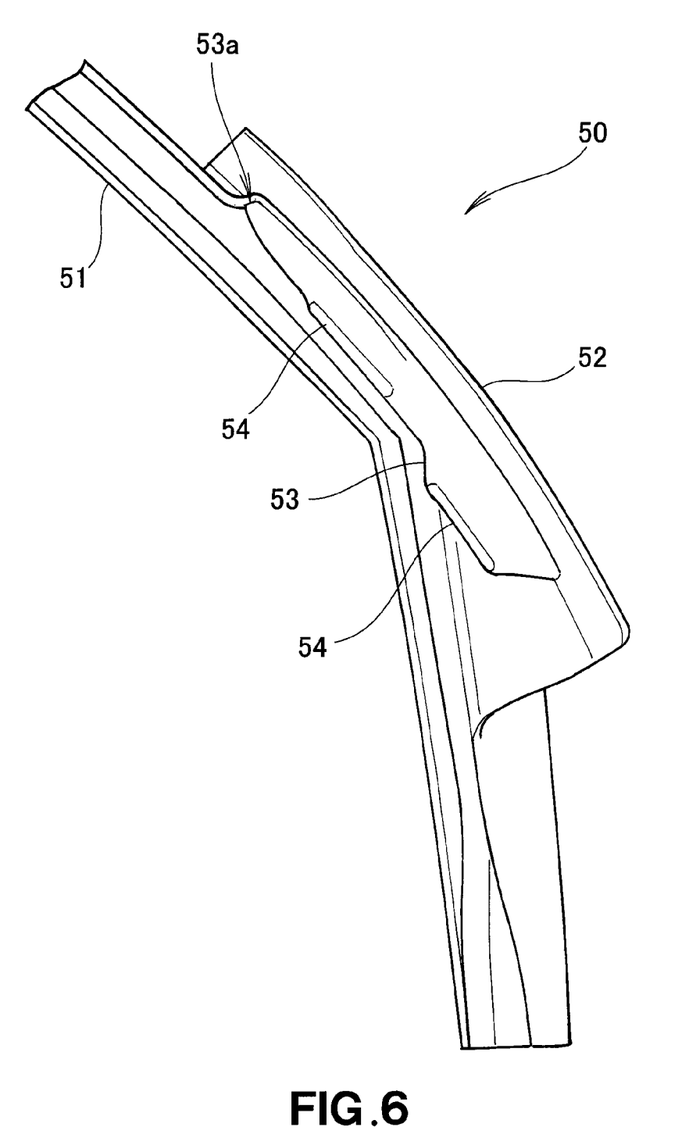
FIG. 6 is an enlarged view of the relevant part of a weather strip according to the present invention.

Next, a discussion is made as to the weather strip 50. As shown in FIG. 6, the weather strip 50 is made of elastic material. The ridge section 52 and the extension section 53 are formed integrally with the body section 51. At two locations on a distal end of the extension section 53, protrusion sections 54, 54 projecting outwardly are provided. The protrusion sections 54, 54 extend along an edge of the extension section 53.

Figure 7:
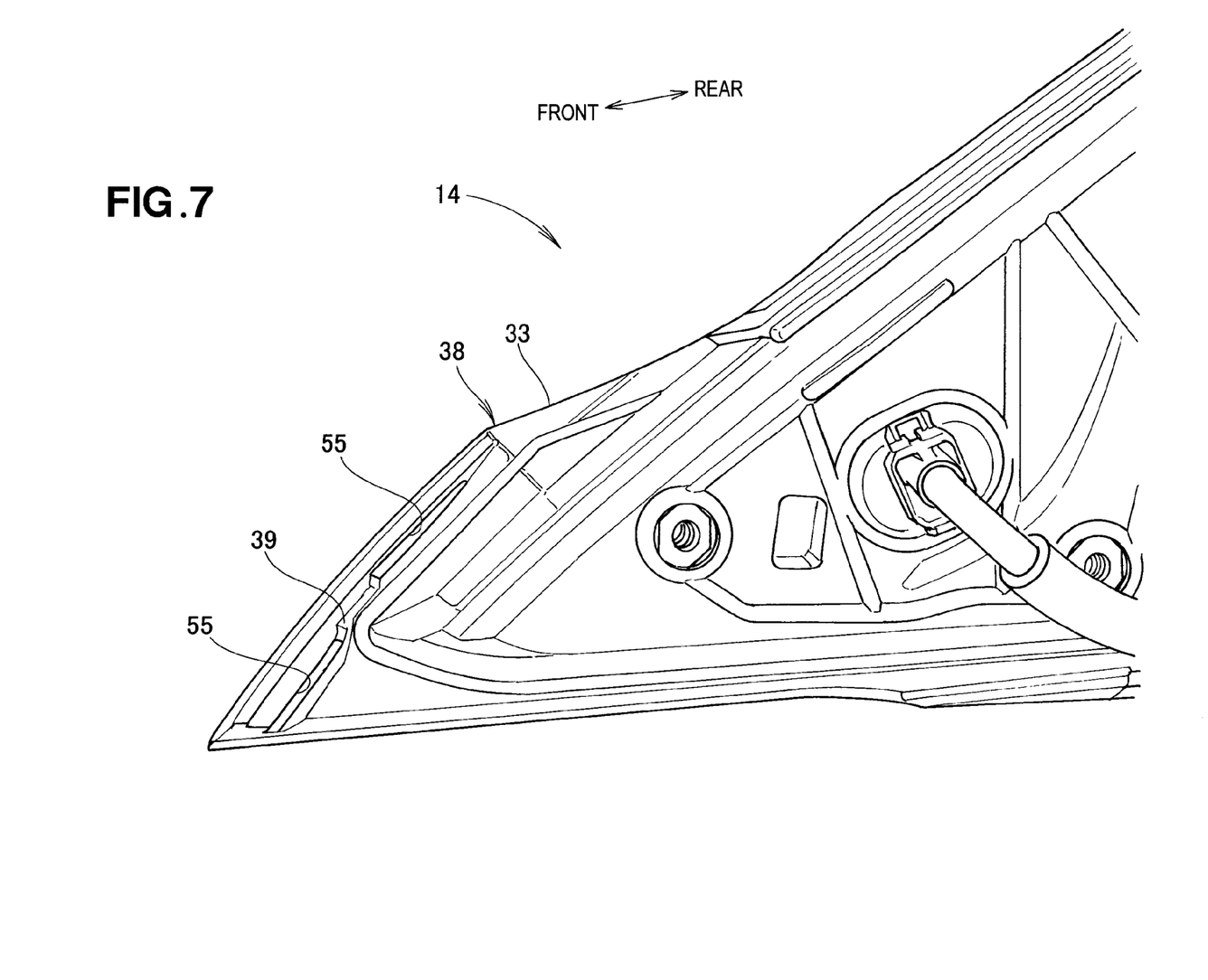
FIG. 7 is an enlarged view of the relevant part of the gap absorbing member according to the present invention.

Next, a discussion is made as to the gap absorbing member 33. As shown in FIG. 7, engagement recesses 55, 55 recessed to engage the protrusion sections 54 (FIG. 6) of the weather strip 50 (FIG. 6) are provided on a back surface 39 of the bulge portion 38 of the gap absorbing member 33. The engagement recesses 55, 55 extend along an edge of the bulge portion 38.

Figure 8:
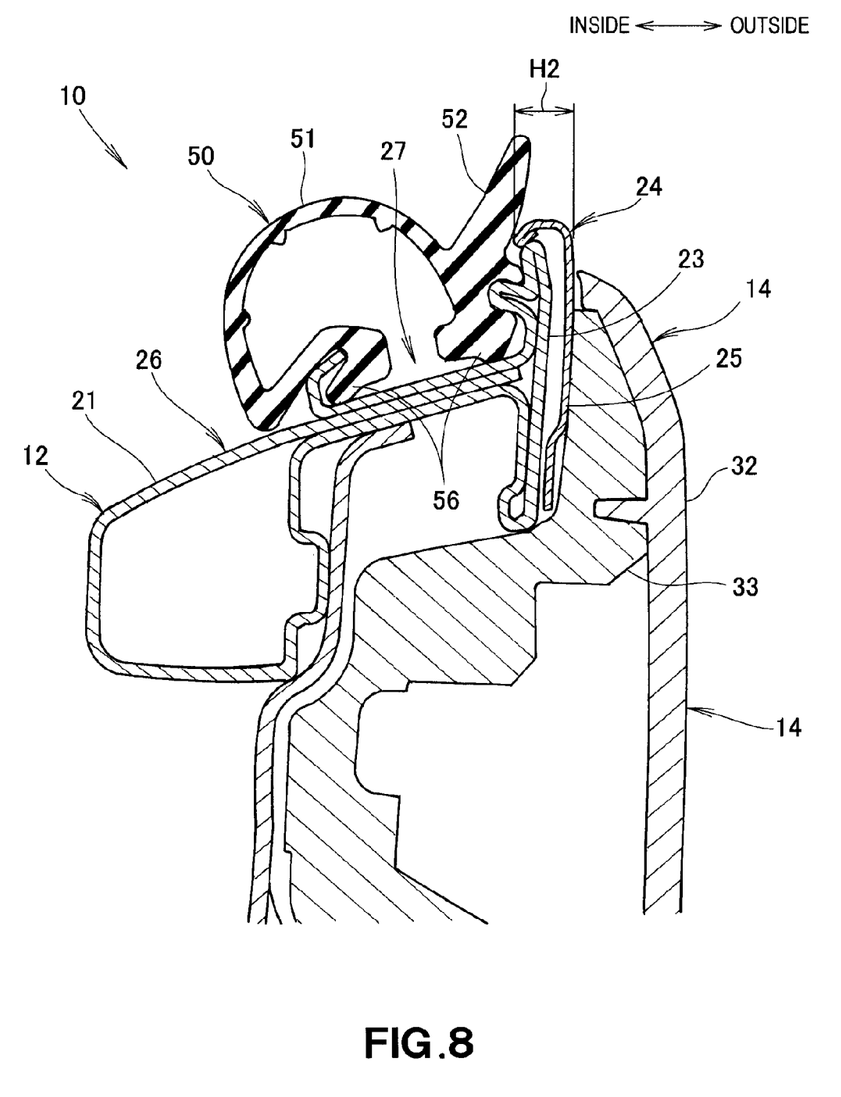
FIG. 8 is a cross-sectional view taken along line 8-8 of FIG. 2.

Next, a discussion is made as to a mounted state of the weather strip 50. As shown in FIG. 8, the door sash 12 has a mounting portion 27 provided on an upper surface 26 thereof for mounting the weather strip 50. The mounting portion 27 is in the form of a U-shaped cross-section. The body section 51 of the weather strip 50 is in the form of a semicircular cross-section. The body section 51 has fitting sections 56 formed at an open part thereof for fitting in the mounting portion 27. The mounting portion 27 has inwardly curved parts defining an opening therebetween while the fitting sections 56 project outwardly, such that the fitting sections 56 are caught on the mounting portion 27.

The door sash moulding 24 is sandwiched between the outside surface 23 of the door sash 12 and the gap absorbing member 33. The gap absorbing member 33 is pressed by the mirror base 32 against the outer surface 25 of the lower end portion of the door sash moulding 24.

Figure 9:
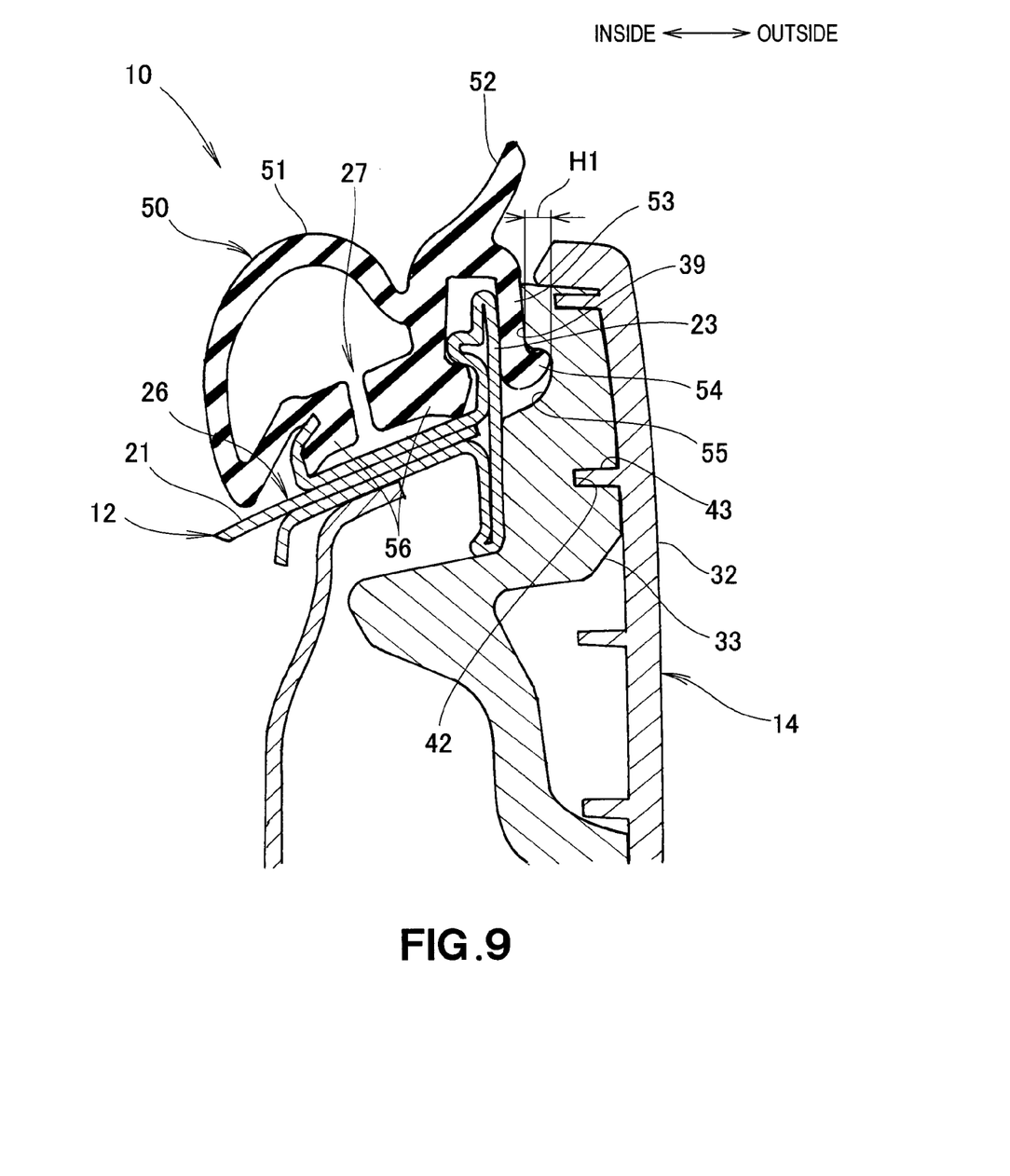
FIG. 9 is a cross-sectional view taken along line 9-9 of FIG. 2.

As shown in FIG. 9, the extension section 53 of the weather strip 50 is sandwiched between the outside surface 23 of the door sash 12 and the gap absorbing member 33. The protrusion section 54 engages the engagement recess 55. That is, the weather strip 50 is difficult to pull out of the door sash 12 not only because the fitting sections 56, 56 are caught on the mounting portion 27 but also because the extension section 53 and the protrusion section 54 are clamped.

The gap absorbing member 33 has a groove 42 provided on an outer side thereof. A rib 43 is provided on the back surface of the mirror base 32. The rib 43 fits in the groove 42 to thereby determine positions of the gap absorbing member 33 and the mirror base 32. The gap absorbing member 33 is pressed by the mirror base 32 against the extension section 53.

A height from the extension section 53 to a distal end of the protrusion section 54 is H1. Turning back to FIG. 8, the door sash moulding 24 has a thickness H2 in a widthwise direction of the vehicle. A relationship between the height H1 and the thickness H2 is defined by H1<H2. This enables the protrusion section 54 to engage the engagement recess 55 with the door mirror 14 abutting on the door sash 12. Since the width H1 is smaller than the thickness H2 of the door sash 12, the weather strip 50 is not pulled out while the vehicular door 10 has a further small thickness.

The vehicular door discussed above is summarized as follows.

As shown in FIGS. 2 and 9, when viewed from the lateral side of the vehicle, the door mirror 14 covers a front lower end portion of the door sash 12. The weather strip 50 has the extension section 53 extending such that the extension section 53 is interposed between the door mirror 14 and the outside surface 23 of the front lower end portion of the door sash 12. The door mirror 14 is used to sandwich the extension section 53 of the weather strip 50 between the door mirror 14 and the outside surface 23 of the door sash 12. That is, the weather strip 50 can be retained by the simple structure in the vehicular door 10 without being lifting up. Since the door mirror 14 and the outside surface 23 of the door sash 12 sandwich the weather strip 50 therebetween, the use of clips can be abolished to thereby reduce the cost.

As shown in FIGS. 2 and 4, since the door sash moulding 24 is mounted to the outside surface 23 of the door sash 12 and the outer surface 25 of the lower end portion of the door sash moulding 24 is covered by the door mirror 14, the part of the door sash moulding 24 covered by the door mirror 14 can be short. The cost of the door sash moulding 24 can be thus reduced. Since the lower end of the door sash moulding 24 is distant from the top portion 11a of the door body 11 in the upward direction of the door and the extension section 53 of the weather strip 50 is located between the lower end 24a of the door sash moulding 24 and the top portion 11a of the door body 11, the door sash moulding 24 and the extension section 53 can be arranged not to overlap in a thickness direction of the door. For this reason, the vehicular door 10 can have a reduced thickness.

As shown in FIG. 4, the extension section 53 of the weather strip 50 abuts on the lower end 24a of the door sash moulding 24 such that the extension section 53 limits a position of the door sash moulding 24 in a longitudinal direction of the door sash moulding 24. As a result, there is no need for additional parts for limiting the position of the door sash moulding 24 in the longitudinal direction of the door sash moulding 24. This leads to reducing the parts cost.

As shown in FIGS. 8 and 9, the extension section 53 of the weather strip 50 includes the protrusion section 54 projecting outwardly in the widthwise direction of the vehicle, and the door mirror 14 includes the engagement recess 55 for engagement with the protrusion section 54. Such a simple arrangement can prevent the weather strip 50 from being pulled out. The protrusion height H1 from the extension section 53 to the distal end of the protrusion section 54 is set to be smaller than the thickness H2 of the door sash moulding 24 in the widthwise direction of the vehicle. For this reason, the protrusion section 54 can engage the engagement recess 55 with the door mirror 14 abutting on the door sash 12, such that the vehicular door 10 has a further small thickness.

As shown in FIGS. 2, 3 and 9, the door mirror 14 includes the mirror body 31, the mirror base 32 mounting the mirror body 31 to the corner 13, and the gap absorbing member 33 provided on the back surface of the mirror base 32. The gap absorbing member having elasticity fills a gap between the mirror base 32 and each of the door sash moulding 24 and the weather strip 50 to thereby provide soundproof effect and waterproof effect. In addition, the gap absorbing member 33 having the elasticity absorbs a difference in dimension between the door sash moulding 24 and the weather strip 50 in the thickness direction of the door. For this reason, the mirror base 32 to be disposed on a vehicular outside of the gap absorbing member 33 can be a planar simple shape. Thus, in a case where the mirror case 32 is made by resin-molding, the moldability is improved.

Although the protrusion sections 54 are provided at the two locations in the embodiment, the number of the locations where the protrusion section 54 is provided may be one, three or the like. The gap absorbing member 33 and the engagement recess 55 may correspond in number to the protrusion section 54 of the weather strip 50. Although the vehicular door 10 is provided on the side of the driver's seat in the embodiment, the door 10 may be adapted to a side of a passenger seat next to the driver' seat.

INDUSTRIAL APPLICABILITY

The technique according to the present invention is suitable for a vehicular door having a weather strip.

REFERENCE SIGNS LIST

10 ... a vehicular door, 11 ... a door body, 11a ... a top portion of the door body, 12 ... a door sash, 13 ... a corner, 14 ... a door mirror, 23 ... a surface of the door sash facing an outside of a vehicle, 24 ... a door sash moulding, 24a ... a lower end of the door sash moulding, 25 ... an outer surface of a lower end portion of the door sash moulding, 31 ... a mirror body, 32 ... a mirror base, 33 ... a gap absorbing member, 50 ... a weather strip, 53 ... an extension section, 54 ... a protrusion section, 55 ... an engagement recess

The invention claimed is:

1. A vehicular door including a door body, a door sash provided on a top portion of the door body, a weather strip provided on vehicular insides of the door sash and the door body for abutment on a surrounding region of an edge of a door opening portion of a vehicle body, and a door mirror provided in a corner between a front top part of the door body and a front bottom part of the door sash,
   wherein the door mirror covers a front lower end portion of the door sash when the door mirror is viewed from a lateral side of a vehicle,
   wherein the weather strip has an extension section extending such that the extension section is interposed between the door mirror and an outside surface of the front lower end portion of the door sash, the outside surface of the front lower end portion of the door sash facing an outside of the vehicle,
   wherein the extension section is sandwiched between the door mirror and the outside surface of the door sash,
   wherein a door sash moulding is mounted to the outside surface of the door sash,
   wherein the door sash moulding includes a lower end portion having an outer surface covered by the door mirror,
   wherein the door sash moulding has a lower end distant from the top portion of the door body in an upward direction of the door, and
   wherein the extension section is located between the lower end of the door sash moulding and the top portion of the door body.

2. The door of claim 1, wherein the extension section abuts on the lower end of the door sash moulding.

3. The door of claim 2, wherein the extension section includes a protrusion section between the door sash moulding and the door body, the protrusion section projecting outwardly in a widthwise direction of the vehicle,
   wherein the door mirror includes an engagement recess engaging the protrusion section, and
   wherein a protrusion height from the extension section to a distal end of the protrusion section is smaller than a thickness of the door sash moulding in the widthwise direction of the vehicle.

4. The door of claim 1, wherein the door mirror includes a mirror body, a mirror base mounting the mirror body to the corner, and a gap absorbing member having elasticity, the gap absorbing member being provided on a back surface of the mirror base, and
   wherein the gap absorbing member is pressed by the mirror base against the door sash moulding and the weather strip.

5. The door of claim 2, wherein the door mirror includes a mirror body, a mirror base mounting the mirror body to the corner, and a gap absorbing member having elasticity, the gap absorbing member being provided on a back surface of the mirror base, and
   wherein the gap absorbing member is pressed by the mirror base against the door sash moulding and the weather strip.

6. The door of claim 3, wherein the door mirror includes a mirror body, a mirror base mounting the mirror body to the corner, and a gap absorbing member having elasticity, the gap absorbing member being provided on a back surface of the mirror base, and
   wherein the gap absorbing member is pressed by the mirror base against the door sash moulding and the weather strip.

* * * * *